(12) United States Patent
Smith et al.

(10) Patent No.: US 11,339,860 B1
(45) Date of Patent: May 24, 2022

(54) SYSTEMS AND METHODS FOR ADJUSTING THE ROTATIONAL TIMING BETWEEN DRIVESHAFTS

(71) Applicant: Brunswick Corporation, Mettawa, IL (US)

(72) Inventors: Joshua S. Smith, Mayville, WI (US); Brian D. Bielen, Oshkosh, WI (US); Thomas G. Theisen, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 575 days.

(21) Appl. No.: 16/507,744

(22) Filed: Jul. 10, 2019

(51) Int. Cl.
| | |
|---|---|
| *B63H 5/10* | (2006.01) |
| *F16H 35/00* | (2006.01) |
| *F16D 3/10* | (2006.01) |
| *F16H 1/22* | (2006.01) |
| *B63H 23/06* | (2006.01) |

(52) U.S. Cl.
CPC .............. *F16H 35/008* (2013.01); *B63H 5/10* (2013.01); *B63H 23/06* (2013.01); *F16D 3/10* (2013.01); *F16H 1/222* (2013.01); *B63H 2005/106* (2013.01); *B63H 2023/067* (2013.01)

(58) Field of Classification Search
CPC ......... F16H 35/008; F16H 1/222; B63H 5/10; B63H 23/06; B63H 2005/106; B63H 2023/067; F16D 3/10
See application file for complete search history.

(56) References Cited

U.S. PATENT DOCUMENTS

| | | | |
|---|---|---|---|
| 1,903,350 | A | 4/1933 | Landrum |
| 3,259,100 | A | 7/1966 | Kiekhaefer |
| 3,487,803 | A | 1/1970 | Alexander, Jr. |
| 5,009,621 | A | 4/1991 | Bankstahl et al. |
| 8,276,274 | B1 | 10/2012 | Tatge et al. |
| 9,815,538 | B2 | 11/2017 | Davis et al. |
| 9,964,160 | B2 | 5/2018 | Palazzolo et al. |
| 10,077,100 | B1 | 9/2018 | Costello |
| 2007/0012129 | A1 | 1/2007 | Maty et al. |
| 2008/0060476 | A1* | 3/2008 | Herlihy ...................... F02C 7/32 74/650 |
| 2013/0199323 | A1 | 8/2013 | Fong et al. |
| 2019/0242277 | A1* | 8/2019 | Mccloy ..................... F16D 3/10 |

\* cited by examiner

*Primary Examiner* — Stephen P Avila
(74) *Attorney, Agent, or Firm* — Andrus Intellectual Property Law, LLP

(57) ABSTRACT

A system for adjusting the rotational timing between driveshafts rotated by an output shaft. The system includes a flange coupler configured to be coupled to a first of the driveshafts to prevent rotation therebetween. The flange coupler defines openings therein. A coupler input gear defines openings therein and is configured to rotatably mesh with a second input gear coupled to a second of the driveshafts. Fasteners are configured to the extend through the openings in the flange coupler and the openings in the coupler input gear to rotationally fix the flange coupler and the coupler input gear, which are fixable at multiple rotational orientations therebetween. The rotational timing between the driveshafts is adjustable by rotating the coupler input gear into different orientations of the multiple rotational orientations relative to the flange coupler prior to fixing the flange coupler to the coupler input gear.

20 Claims, 8 Drawing Sheets

SYSTEMS AND METHODS FOR ADJUSTING THE ROTATIONAL TIMING BETWEEN DRIVESHAFTS

FIELD

The present disclosure generally relates to systems and methods for adjusting the rotational timing between driveshafts, and more particularly to systems and methods for adjusting the rotational timing between two or more driveshafts incorporated within marine propulsion devices.

BACKGROUND

The following U.S. Patents and Patent Applications provide background information and are incorporated by reference in entirety.

U.S. Pat. No. 5,009,621 discloses a dual counter-rotating propeller drive mechanism for a marine propulsion system that incorporates a torque splitting device which consists of a differential gear means and a ratio gear means. The torque splitting device assigns a selectable fixed fraction of the engine torque to each propeller regardless of power, thrust, and speed conditions. The rear one of the two propellers adjusts its rotational speed relative to the front propeller in response to changes in the front propeller's wake and in this way maintains optimum propulsive efficiency over a wide range of operating conditions. Furthermore, precise matching of front and rear propeller parameters for a given application is no longer required.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a system for adjusting the rotational timing between driveshafts rotated by an output shaft. The system includes a flange coupler configured to be coupled to a first of the driveshafts to prevent rotation therebetween. The flange coupler defines openings therein. A coupler input gear defines openings therein and is configured to rotatably mesh with a second input gear coupled to a second of the driveshafts. A plurality of fasteners are configured to the extend through the openings in the flange coupler and the openings in the coupler input gear to rotationally fix the flange coupler and the coupler input gear, where the flange coupler and the coupler input gear are fixable at multiple rotational orientations therebetween. The rotational timing between the driveshafts is adjustable by rotating the coupler input gear into different orientations of the multiple rotational orientations relative to the flange coupler prior to fixing the flange coupler to the coupler input gear.

Another embodiment generally relates to a method for adjusting the timing between driveshafts transmitting power from an output shaft to a plurality of propeller shafts. The method includes coupling a flange coupler to a first of the driveshafts to prevent rotation therebetween. The flange coupler defines openings therein. The method includes rotationally meshing a coupler input gear with a second input gear coupled to a second of the driveshafts. The coupler input gear defines openings therein. At least portions of the openings in the flange couplers are aligned with the openings in the coupler input gear. The method includes locking one of the first of the driveshafts and the second of the driveshafts to prevent rotation thereof and applying a preloading torque by rotating the other of the first of the driveshafts and the second of the driveshafts while the one of the first of the driveshafts and the second of the driveshafts is locked. The method includes fixing the flange coupler to the coupler input gear via a plurality of fasteners extending through the openings in the flange coupler and the openings in the coupler input gear, then unlocking the one of the first of the driveshafts and the second of the driveshafts.

Another embodiment generally relates to a gearcase for a marine propulsion device providing adjustable rotational timing between driveshafts rotated by an output shaft. The system includes a flange coupler configured to be coupled to a first of the driveshafts to prevent rotation therebetween. The flange coupler defines openings therein. A coupler input gear defines openings therein and is configured to rotatably mesh with a second input gear coupled to a second of the driveshafts. A plurality of fasteners are configured to the extend through the openings in the flange coupler and the openings in the coupler input gear to rotationally fix the flange coupler and the coupler input gear, where the flange coupler and the coupler input gear are fixable at multiple rotational orientations therebetween. Counter-rotating propeller shafts are rotated by the driveshafts, where each of the counter-rotating propeller shafts if configured to rotate a propeller. The rotational timing between the driveshafts is adjustable by rotating the coupler input gear into different orientations of the multiple rotational orientations relative to the flange coupler prior to fixing the flange coupler to the coupler input gear.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

The present inventors have identified problems within the prior art relating to the incorporation of two or more driveshafts, particularly within the space of marine propulsion devices. For example, the present inventors have identified that when attempting to transfer power or torque through a gearcase via parallel and simultaneous paths, it is critical that the stiffness and preloading, as well as the backlash of the load paths relative to each other, be understood and controlled. This process of ensuring proper timing and preloading between driveshafts is presently very challenging and time-consuming. For the sake of brevity, all of these adjustment parameters will generally be referred to herein simply as adjustments to the rotational timing between driveshafts.

Figure 1:
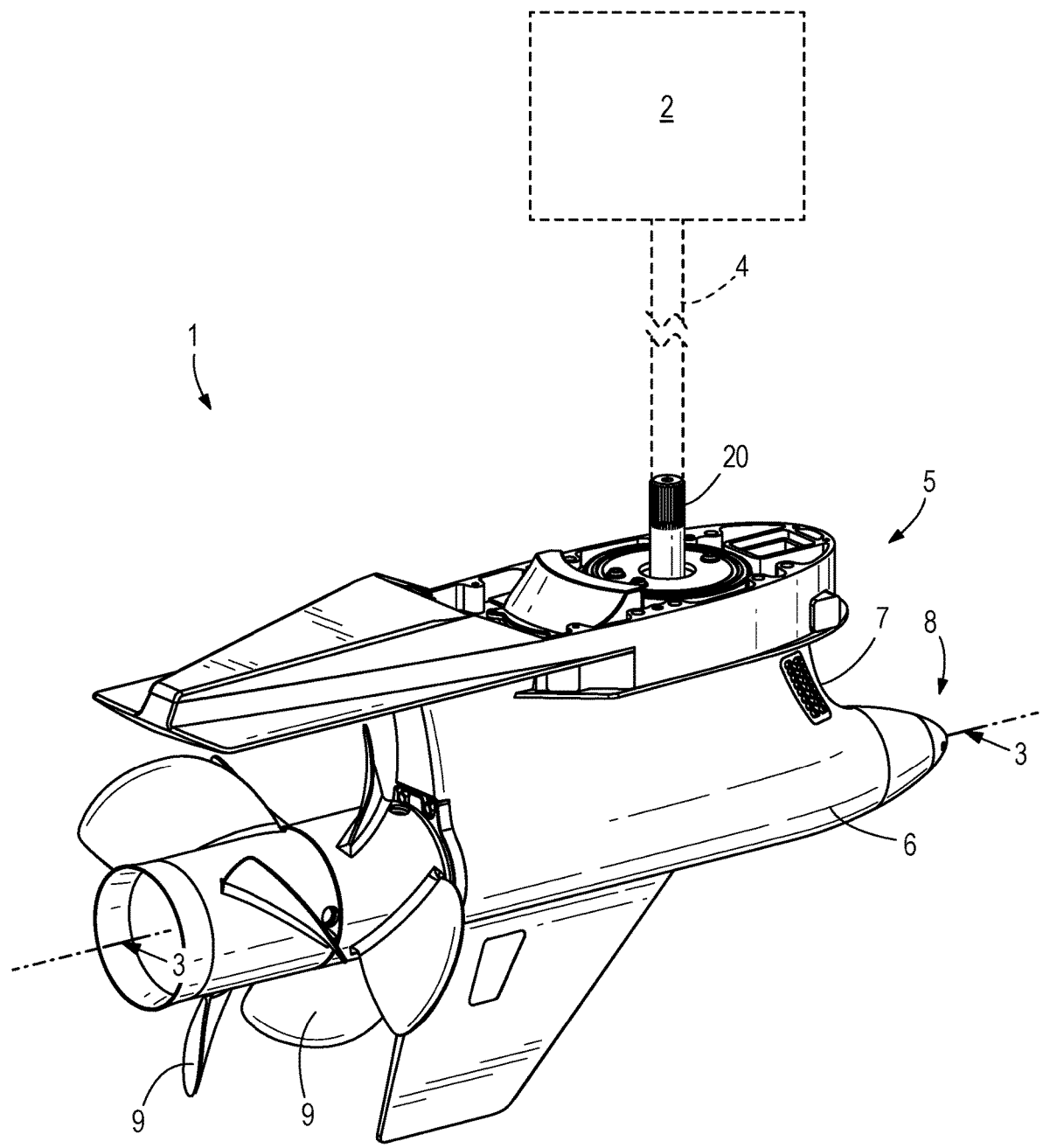
FIG. 1 is a rear isometric view of a lower gearcase incorporating on embodiment of a system for adjusting rotational timing between driveshafts according to the present disclosure.

FIG. 1 shows an exemplary gearcase 5 similar to those of marine propulsion devices known in the art, but now incorporating a system 1 for adjusting the rotation between driveshafts according to the present disclosure. In particular, the system 1 provides for adjusting the rotational timing between two or more driveshafts rotated by an output shaft 4, whereby the output shaft 4 is rotated by an engine 2 in a customary manner. The driveshafts are rotatably supported by driveshaft bearings 29. As will become apparent, some of the driveshafts are indirectly rotated by the output shaft 4 through engagement between the output shaft 4 and another one of the driveshafts, input shaft 20. In the embodiment shown, the gearcase 5 has a nose cone 8 on a forward side, a torpedo 6 extending between the forward and aft sides, and propellers 9 at the aft side for propelling the marine device through the water in a customary manner. A water intake 7 for the gearcase 5 is also shown.

Figure 2:
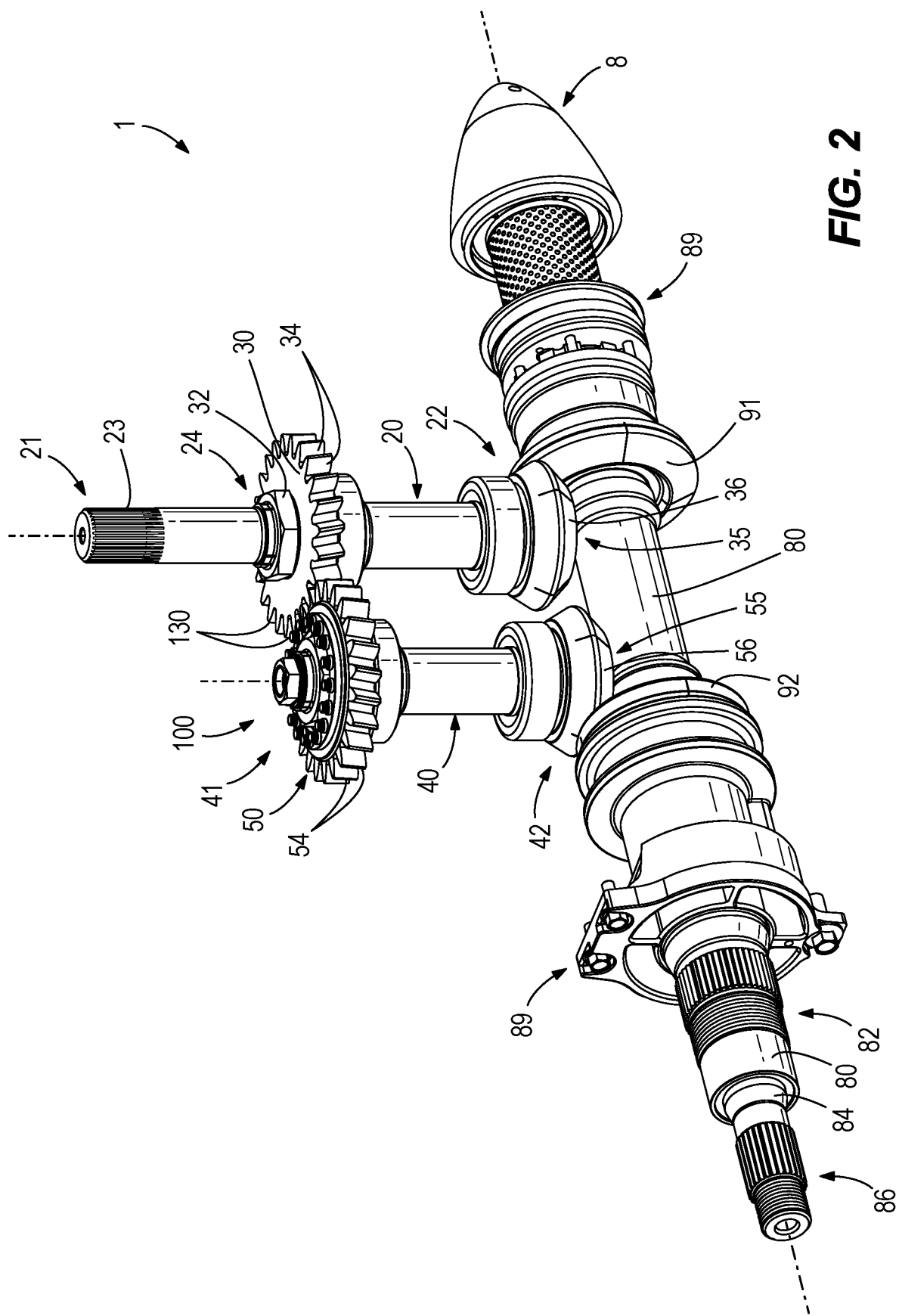
FIG. 2 is an inside isometric view of the system incorporated within the embodiment shown in FIG. 1 according to the present disclosure.
Figure 3:
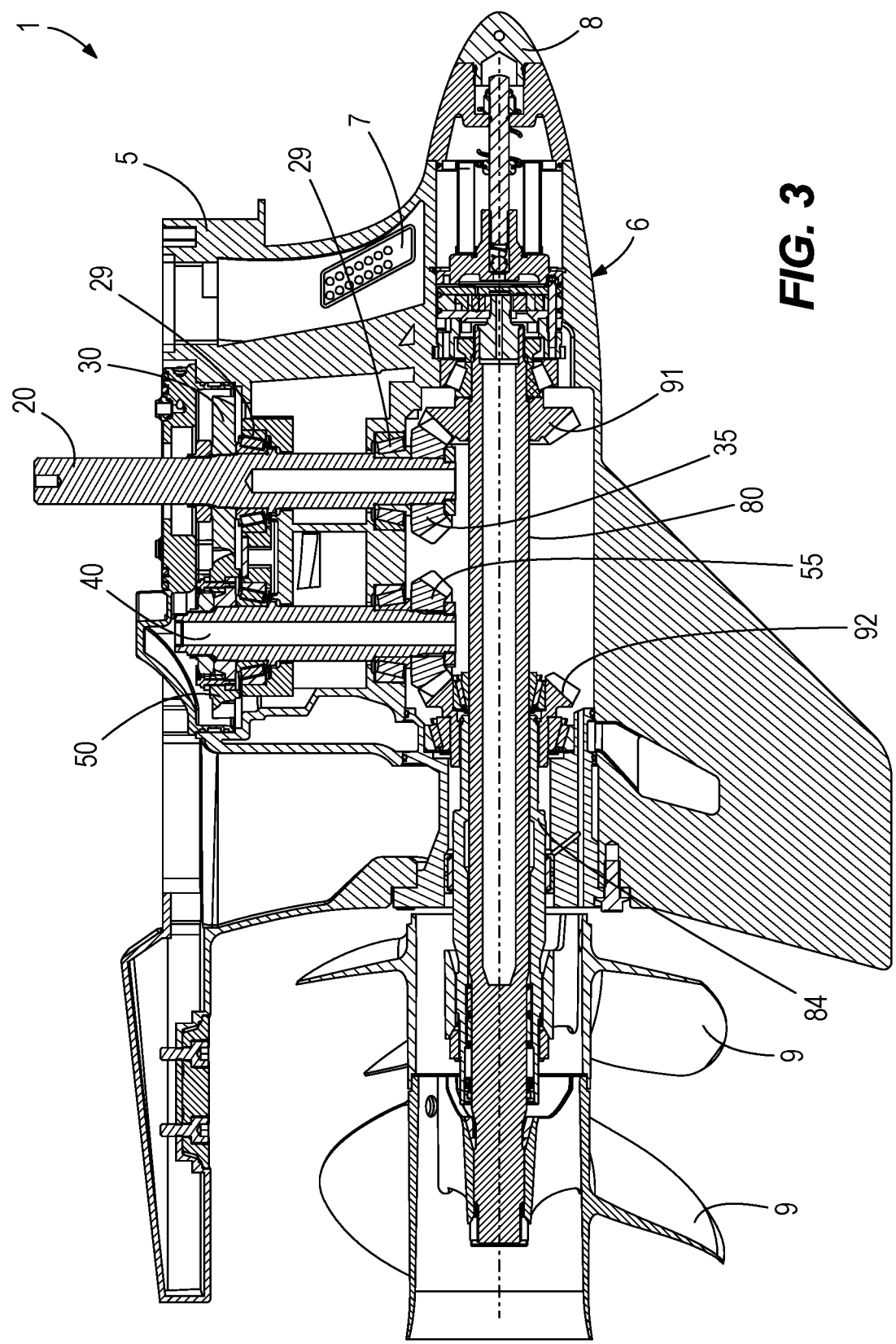
FIG. 3 is a sectional view taken along the line 3-3 from FIG. 1.

FIGS. 2 and 3 show one embodiment of a presently disclosed system 1 as incorporated within the gearcase 5 shown in FIG. 1. In the present embodiment, the system 1 provides for adjusting the rotational timing between an input shaft 20 and a first lay shaft 40 as the driveshafts in a two driveshaft configuration. The input shaft 20 has an input end 21 configured to be coupled to the output shaft 4 rotated by the engine 2. The input end 21 may be coupled to the output shaft 4 via a coupler (not shown) engaging with a connection region 23, shown here to have splines, in a manner known in the art. An input gear 30 is coupled to the input shaft 20 via an input gear coupler connection region 24 with a coupler 32 coupled thereto, once again in a conventional manner. In the embodiment shown, the input gear 30 is a helical gear having teeth 34, though other types of input gears 30 are also anticipated, including straight splines, herringbone gears, beveled gears, belts, chains, and/or the like. These power transmission components may be provided as parallel axes, or non-parallel configurations, depending on the needs of the gearcase 5.

The input shaft 20 further has an output end 22 that is opposite the input end 21. An output gear 35 is coupled to the output end 22 in a manner known in the art. The output gear 35 engages with a first propeller shaft gear 91 coupled to one or more propeller shafts, such as the forward shaft 80 shown. As with the input gear 30, the output gear 35 may have more teeth 36 for engaging with like teeth on the first propeller shaft gear 91, for example.

In the embodiment shown, the propeller shafts are dual, counter-rotating propeller shafts that include a forward shaft 80 and an aft shaft 84, each of which are supported within the gearcase 5 by propeller shaft bearings 89 in a conventional manner. In this manner, the input shaft 20 is rotated by the engine 2, and in turn transfers this rotation to the forward shaft 80 via engagement between the output gear 35 and the first propeller shaft gear 91.

With continued reference to FIG. 2, the system 1 further incorporates a first lay shaft 40 that also extends between an input end 41 and an output end 42. The input end 41 is coupled to an input gear 50, which is discussed further below. The input gear 50 includes teeth 54 or other features configured to rotatably mesh with the input gear 30 of the input shaft 20. An output gear 55 is coupled to the output end 42 of the first lay shaft 40 and also has teeth 56 for engaging with a second propeller shaft gear 92 coupled to the aft shaft 84 in a similar manner to that previously described between the first propeller shaft 91 and the forward shaft 80. As such, rotation of the input shaft 20 causes rotation of the aft shaft 84 in addition to the forward shaft 80, by virtue of the engagement between the input gear 30 on the input shaft 20 and the input gear 50 of the first lay shaft 40. The propellers 9 (FIG. 3) are coupled to the forward shaft 80 and aft shaft 84 via engagement with a propeller coupling region 82 and a propeller coupling region 86, respectively, in a conventional manner.

Figure 4:
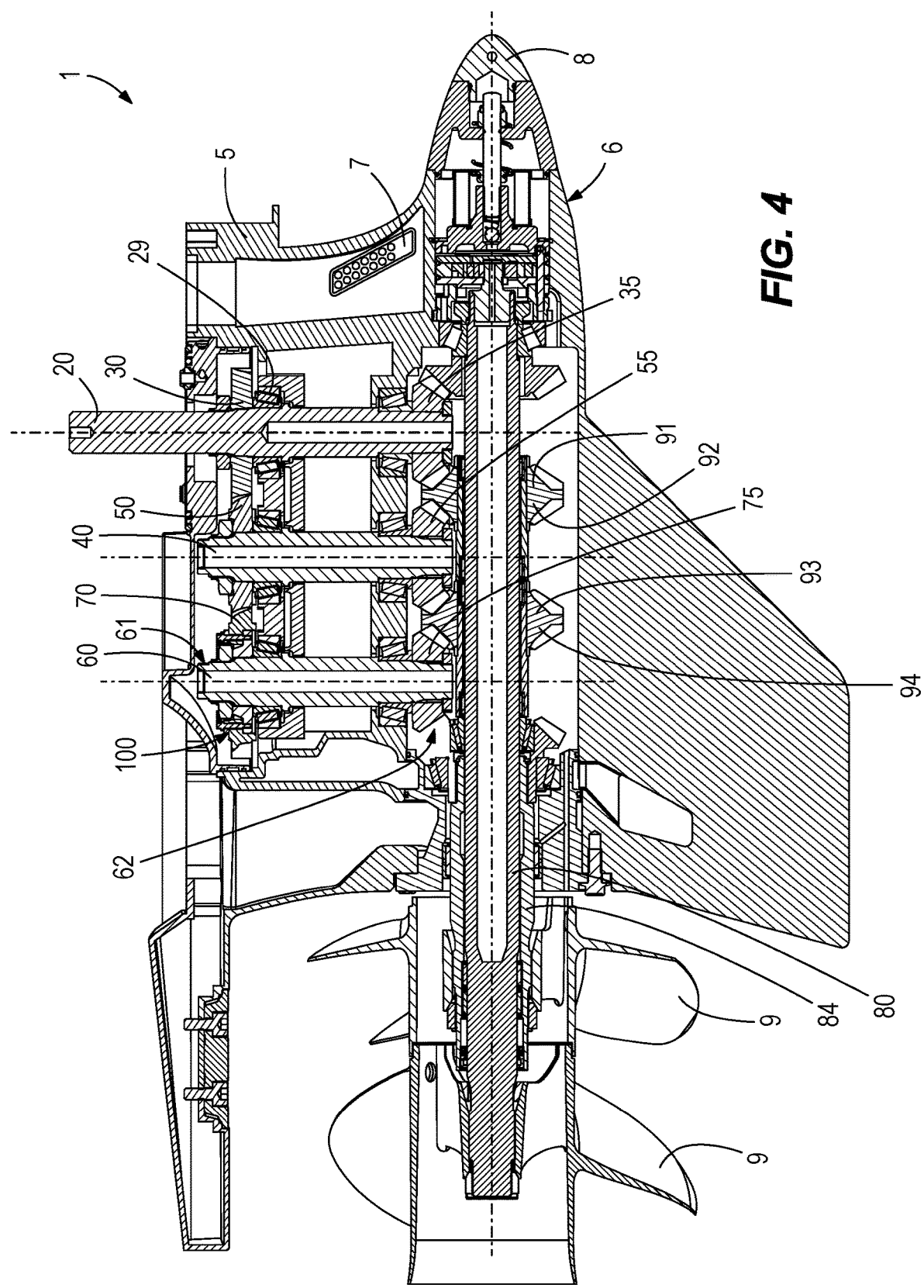
FIG. 4 is a sectional view of an embodiment similar to that shown in FIG. 3, but incorporating three driveshafts according to the present disclosure.

FIG. 4 discloses an alternate embodiment similar to that shown in FIG. 3, but now having three driveshafts rather than two. In particular, the embodiment includes an input shaft 20, first lay shaft 40, and second lay shaft 60, all of which are parallel and extend within a common, vertical plane. The first lay shaft 40 is rotated by the input shaft 20 via meshing between the input gear 30 and the input gear 50 coupled thereto, respectively. The second lay shaft 60 extends between an input end 61 and an output end 62 in a similar manner to that described above with respect to the first lay shaft 40. Likewise, an input gear 70 is coupled to the second lay shaft 60, which meshes with the input gear 50 of the first lay shaft 40 in a manner previously described. An output gear 75 is also coupled to the second lay shaft 60 at the output end 62, which also has teeth (not shown) similar to the teeth 56 described above with respect to the output gear 55 of the first lay shaft 40.

Rotation of the input shaft 20 causes rotation of both the first lay shaft 40 and the second lay shaft 60, whereby the first lay shaft 40 rotates in an opposite direction relative to the input shaft 20 and second lay shaft 60. In the embodiment shown, rotation of these driveshafts causes rotation of one or more propeller shafts, shown here as a forward shaft 80 and aft shaft 84, as previously described. The output gear 35 of the input shaft 20 is shown to mesh with a first propeller shaft gear 91 coupled to the aft shaft 84. The output gear 55 of the first lay shaft 40 meshes with a second propeller shaft gear 92 also coupled to the aft shaft, as well as meshing with a third propeller shaft gear 93 that is coupled to the forward shaft 80 to transmit rotation thereto. Finally, the output gear 75 of the second lay shaft 60 meshes with a fourth propeller shaft gear 94 coupled to the forward shaft 80. In this manner, the torque produced by the output shaft 4 of the engine 2 (FIG. 1) is divided across the three driveshafts: input shaft 20, first lay shaft 40, and second lay shaft 60, which transfer the rotational forces to the forward shaft 80 and aft shaft 84 to turn the propellers 9.

It should be recognized that in the present case, the first propeller shaft gear 91 and the second propeller shaft gear 92 comprise opposite sides of a single structure (i.e. a bull gear), and likewise for the third propeller shaft gear 93 and the fourth propeller shaft gear 94. However, these elements may also be provided independently for the same effect.

Through experimentation and development, the present inventors have identified advantages to increasing the power density of a marine propulsion device, particularly for non-inboard applications in which the gearcase 5 is part of a wetted surface of the propulsion device. In particular, it is beneficial to reduce the size, and particularly diameter, of the torpedo 6 (FIG. 1), reducing the drag on the gearcase 5. This in turn results in an improvement in fuel economy, acceleration, and top speed for a marine vessel propelled by the propulsion device.

Accordingly, the present inventors have identified that an optimal embodiment for maximizing power density and drag reduction may be obtained by dividing the torque produced by the engine 2 across as many gear meshes as possible (in other words, across as many driveshafts as possible). However, the present inventors have further identified that the physical limit for a system 1 in which all driveshafts are located in a same plane (thus having the smallest drag), is three driveshafts driving four gears for a dual, counter-rotating propeller shaft, and three driveshafts driving three gears for a single propeller shaft.

Additionally, the present inventors have further identified that there are substantial challenges with significant associated time and expense to ensure proper timing and preloading when using multiple driveshafts, which may be further exacerbated by a system including three driveshafts (input shaft 20, first lay shaft 40, and second lay shaft 60) such as that shown in FIG. 4.

Figure 5:
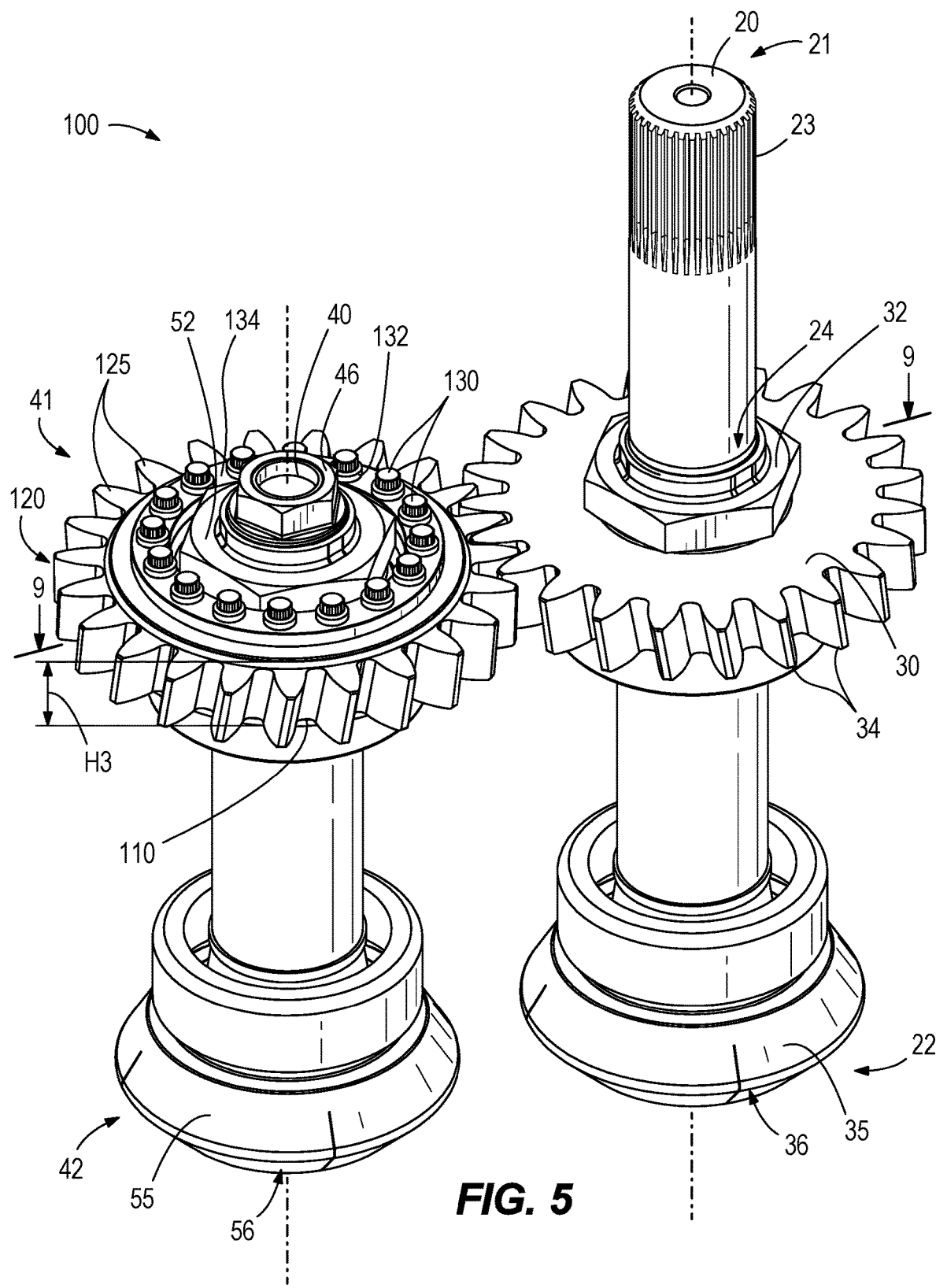
FIGS. 5 and 6 are close up and exploded views of a portion of the system shown in FIG. 2, respectively.

FIGS. 5-9 show an exemplary adjustment system 100 within the system 1 for adjusting this rotational timing between driveshafts, which are rotated (directly or indirectly) by an output shaft 4 of an engine 2 as previously described. FIG. 5 shows the adjustment system 100 used in conjunction with the first lay shaft 40. However, the same may be incorporated in addition or in the alternative on the input shaft 20 and/or a second lay shaft 60 (see e.g. FIG. 4), for example.

Figure 6:
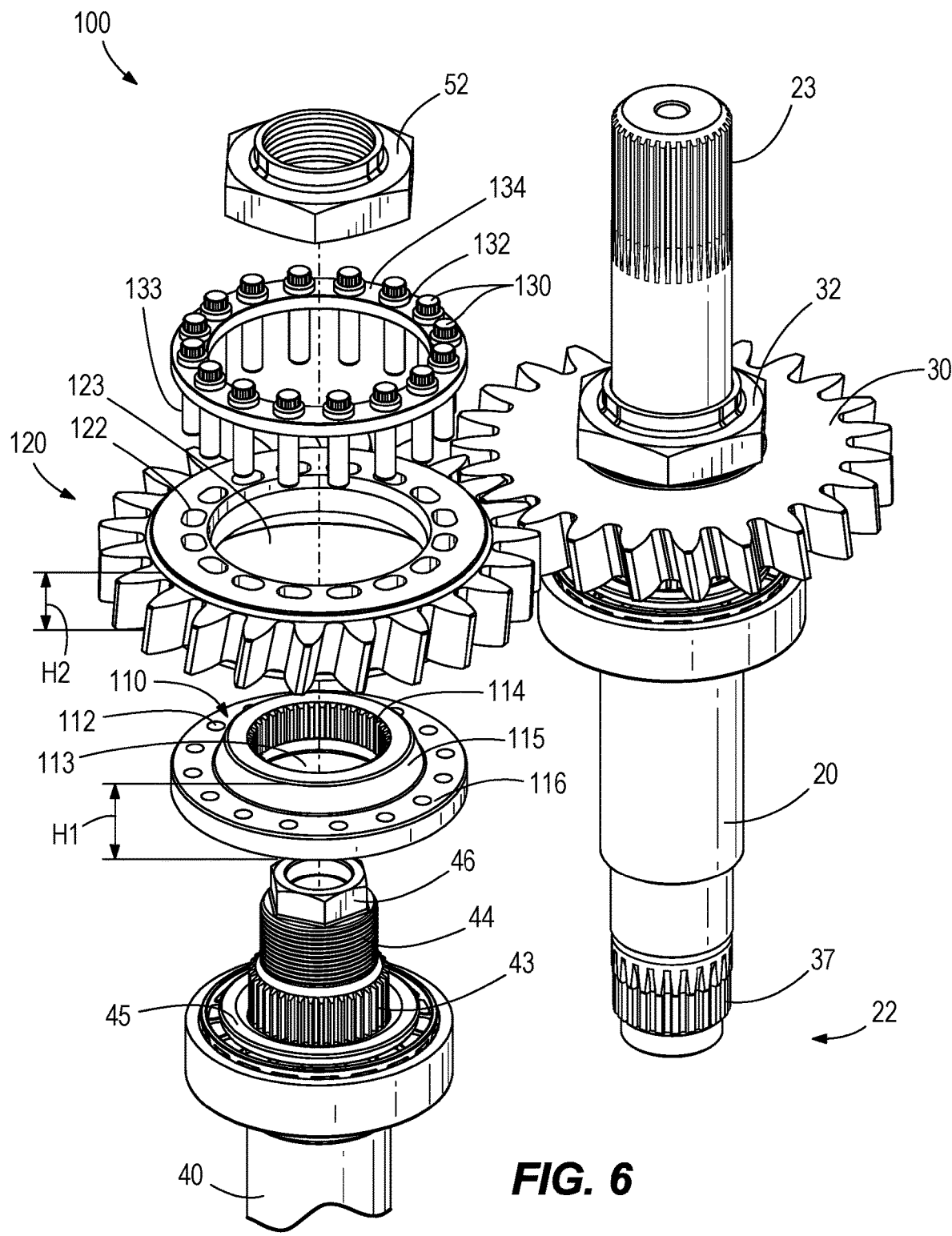
Figure 7:
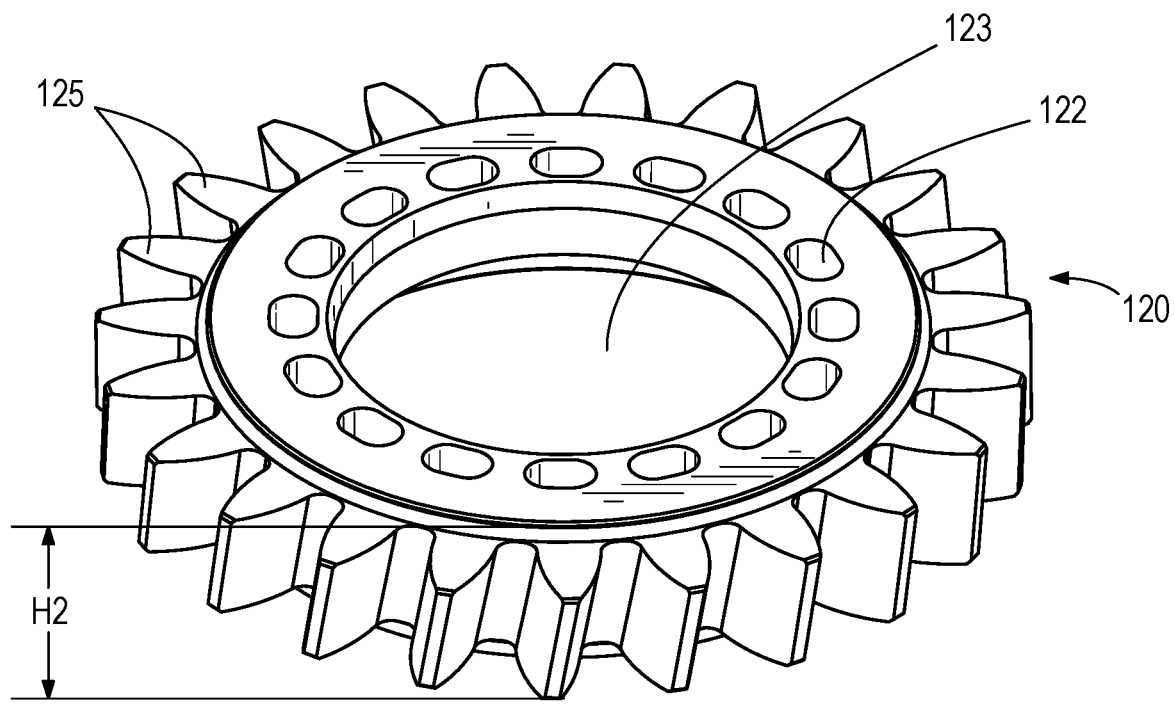
FIGS. 7 and 8 are close up views of components from the exploded view of FIG. 6.
Figure 8:
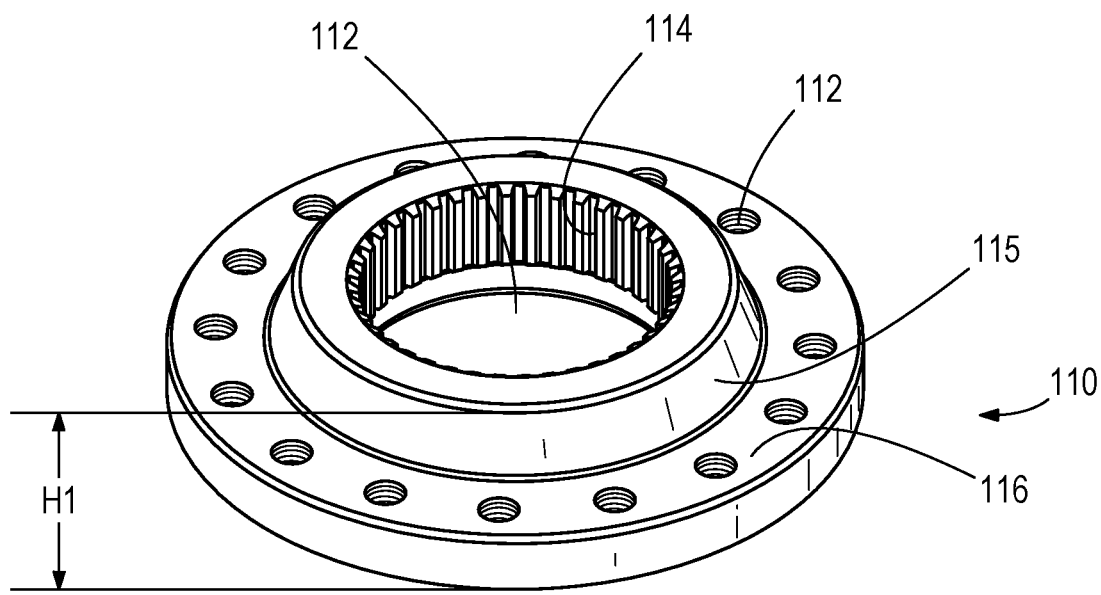

As best seen in the exploded view of FIG. 6, the adjustment system 100 includes a flange coupler 110 configured to be coupled to one of the driveshafts, such as the first lay shaft 40, to prevent rotation therebetween. Flange coupler 110 has a flange coupler height H1 and defines a central opening 113 in the center for receiving the first lay shaft 40. The flange coupler 110 and lay shaft 40 are non-rotatably fixed via coupling features 114 defined within the flange coupler 110 (shown here as splines), and corresponding coupling features 43 on the first lay shaft 40. The flange coupler 110 is non-adjustable relative to the first lay shaft 40; therefore adjustment of the system 100 is provided by the relative rotation between the flange coupler 110 and a coupler input gear 120, which is discussed further below.

The flange coupler 110 further defines openings 112 within a base portion 116 thereof. In the present embodiment, the openings 112 are defined entirely through the flange coupler 110 and are threaded to receive a fastener 130. Likewise, in the present embodiment, the flange coupler 110 includes a frustoconical portion 115, which is at least partially received within a central opening 123 defined with the coupler input gear 120 when coupled thereto. The coupler input gear 120 has a coupler input gear height H2. The nesting of the frustoconical portion 115 reduces the overall height H3 of the adjustment system 100 (relative to the sum of the flange coupler height H1 and the coupler input gear height H2) when the flange coupler 110 is coupled to a coupler input gear 120. The flange coupler 110 is configured to rest upon a support shelf 45 of the first lay shaft 40 when secured thereto.

The coupler input gear 120 (which in this case is the input gear 50 previously described and shown in FIGS. 2-4) is configured to rotatably mesh via teeth 125 with the teeth 34 on the input gear 30 coupled to the input shaft 20, and/or an input gear 70 of a second lay shaft 60. It will be recognized that while the present embodiment depicts the system 100 having the coupler input gear 120 coupled to the first lay shaft 40, the system 100 may be utilized such that the coupler input gear 120 and other associated components with the system 100 are provided with the input shaft 20, first lay shaft 40, and/or second lay shaft 60. Each configuration allows for adjustment of the rotational timing and preloading between driveshafts.

Figure 9:
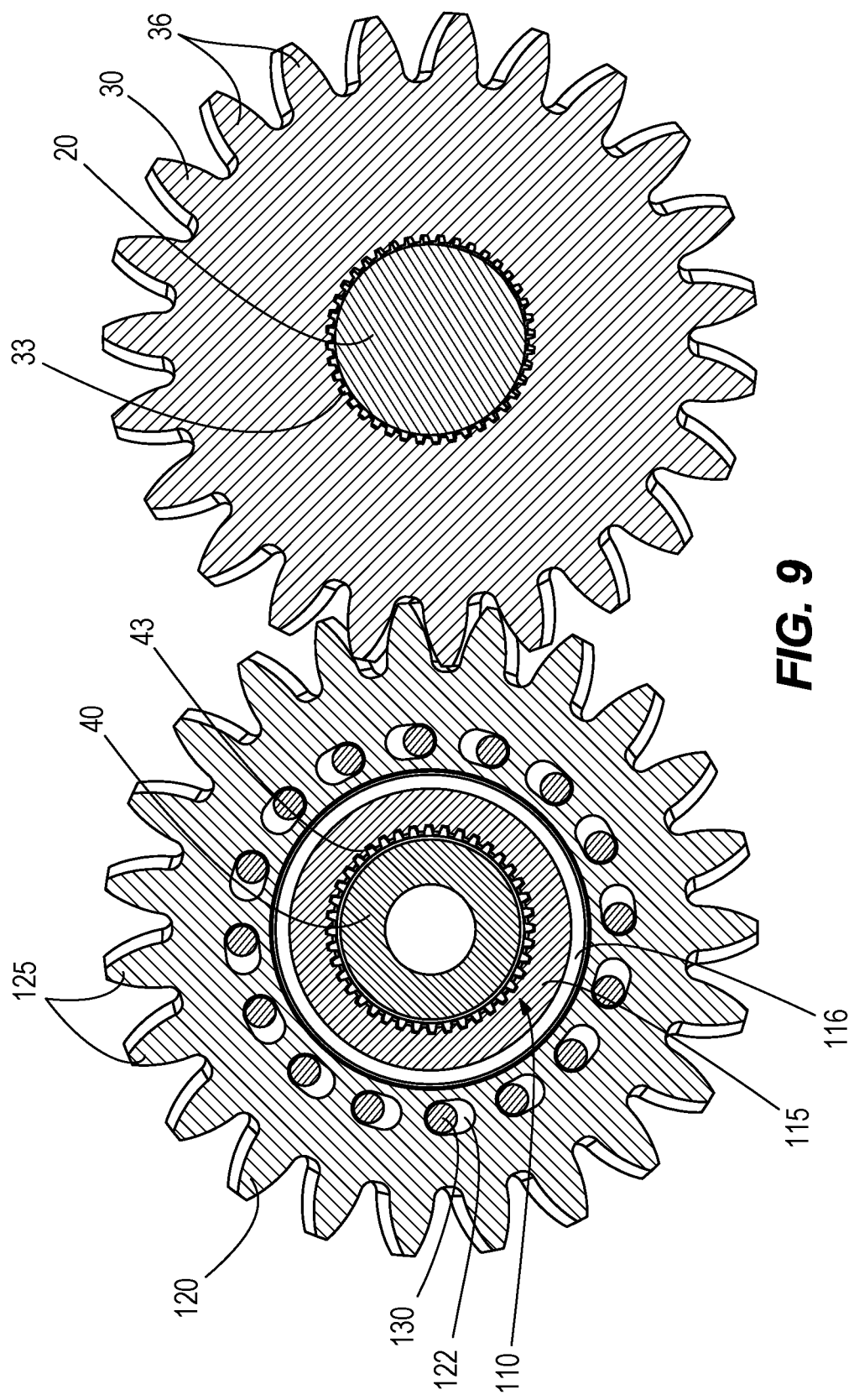
FIG. 9 is a top down sectional view taken along the line 9-9 from FIG. 5.

As shown in FIG. 6, the coupler input gear 120 further defines openings 122 spaced apart around the central opening 123, which are configured to allow fasteners 130 to extend therethrough. As shown in FIG. 9, the present inventors have identified that defining the openings 122 to have kidney-shaped cross sections is particularly advantageous for allowing the coupler input gear 120 to be rotatable relative to the flange coupler 110 while fasteners 130 extend through the openings 122 and openings 112 within the flange coupler 110, for example. In this manner, the flange coupler 110 and the coupler input gear 120 are fixable at multiple rotational orientations therebetween before the fasteners 130 are tightened, allowing for adjustment of timing between the first lay shaft 40 and the input shaft 20 (or other respective driveshafts).

FIGS. 5 and 6 show an embodiment of an adjustment system 100 that further includes a washer ring 134 configured to be positioned between the top or head of the fasteners 130 and the coupler input gear 120. Washers 132 are also provided with each fastener 130 to be placed thereon prior to the fastener 130 extending through the washer ring 134. The elongated portion 133 of each fastener 130 thereby extends through the washer 132, through the washer ring 134, through the coupler input gear 120 (particularly through an opening 122), and finally into and threadingly engaged with one of the openings 112 defined in the flange coupler 110. It should be recognized that in alternative embodiments, the openings 112 in the flange coupler 110 may not extend entirely therethrough, or may be non-threaded. In certain cases, a nut or other receiver may be required to retain the elongated portion 133 on the opposite side of the flange coupler 110 to the coupler input gear 120, for example.

The entire adjustment system 100 is retained on the support shelf 45 of the first lay shaft 40 by a connector 52, such as the nut, configured to be threadingly engaged with an input shaft connection region 44 defined on the first lay shaft 40.

One or more of the driveshafts is further configured to have a torque application feature 46 for rotating and pre-loading the driveshaft, shown here for first lay shaft 40. This allows the driveshaft to be pre-loaded prior to tightening the fasteners 130 that fix the coupler input gear 120 relative to the flange coupler 110, locking in this pre-loading.

In this manner, adjusting the timing and pre-loading between driveshafts is accomplished by coupling the flange coupler 110 to one of the driveshafts (i.e. the first lay shaft 40), positioning the coupler input gear 120 on the flange coupler 110 (with fasteners 130 not yet tightened), and meshing the coupler input gear 120 with a second input gear (i.e. input gear 30 of the input shaft 20). The one or more propeller shafts (i.e., forward shaft 80 and in some cases the aft shaft 84) are then rotationally locked to prevent rotation. The gearcase 5 is also prevented from rotating. From there, equal but opposite pre-loading torques are simultaneously applied to the driveshafts (i.e., input shaft 20 and first lay shaft 40), such as by positioning a wrench on the torque application feature 46 (shown here as a hexhead) thereon. In certain embodiments, the process uses two breaker bars with a socket on each and a spring in between them, ensuring equal and opposite torques are applied to each shaft. This effectively preloads the system 1 in the primary direction of torque transmission, except for the input gear 30 and coupler input gear 120, since the coupler input gear 120 is not rotatably fixed to the flange coupler 110 at this point. A torque is then also applied to the coupler input gear 120 such that the backlash between the coupler input gear 120 and the input gear 30 is reduced to effectively zero. Additionally, a torque is also applied to the flange coupler 110 such that the backlash in the splines/coupling features between the flange coupler 110 and the shaft to which it is coupled is also reduced to effectively zero (note that this may require the fasteners to slip/slide through their openings in gear 120). In certain embodiments, the torque applied by hand to the flange coupler 110 and the gear 120 is less than the torque applied to the driveshafts. The fasteners 130 are then sufficiently tightened to prevent slippage between the input gear 120 and the flange coupler 110 upon release of the equal and opposite torques applied to the driveshafts. The one or more propeller shafts are then released, as are the equal and opposite torques to the driveshafts, and the driveshaft (i.e., first lay shaft 40) engaging the flange coupler 110 is held still while the fasteners 130 may be tightened to rotationally fix the flange coupler 110 and the coupler input gear 120. The driveshaft (i.e., first lay shaft 40) engaging the flange coupler 110 may be held still via a wrench engaging with the torque application feature 46 thereon, for example.

The present inventors have identified that by using the adjustment system 100 as presently disclosed, it also becomes possible to set the parallel path preloads of driveshafts separately from the path-to-path coupling backlash. In other words, the backlash can be removed for upper gears (i.e., the input gear 30 and coupler input gear 120) as a separate step from removing the backlash in lower gears (i.e., between the output gear 35 and the first propeller shaft gear 91), rather than resolving these simultaneously. This is true whether that coupling consists of gears, chains, or synchronous belts, for example. Furthermore, the process of adjusting is consequently simplified and accomplished in less time than using system presently known in the art.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for adjusting the rotational timing between driveshafts rotated by an output shaft, the system comprising:
   a flange coupler configured to be coupled to a first of the driveshafts to prevent rotation therebetween, the flange coupler defining openings therein;
   a coupler input gear that defines openings therein, wherein the coupler input gear is configured to rotatably mesh with a second input gear coupled to a second of the driveshafts; and
   a plurality of fasteners configured to the extend through the openings in the flange coupler and the openings in the coupler input gear to rotationally fix the flange coupler and the coupler input gear, wherein the flange coupler and the coupler input gear are fixable at multiple rotational orientations therebetween;
   wherein the rotational timing between the driveshafts is adjustable by rotating the coupler input gear into different orientations of the multiple rotational orientations relative to the flange coupler prior to fixing the flange coupler to the coupler input gear.

2. The system according to claim 1, wherein the openings in at least one of the flange coupler and the coupler input gear have elongated shapes to accommodate the flange coupler and the coupler input gear being fixable at the multiple rotational orientations therebetween.

3. The system according to claim 1, wherein the openings in at least one of the flange coupler and the coupler input gear are kidney shaped to accommodate the flange coupler and the coupler input gear being fixable at the multiple rotational orientations therebetween.

4. The system according to claim 1, wherein the second of the driveshafts is configured to be rotated by the output shaft, and wherein rotation is transferred to the first of the driveshafts via engagement between the second input gear and the coupler input gear.

5. The system according to claim 1, wherein the driveshafts are configured to rotate a plurality of propeller shafts, and wherein the driveshafts are parallel to each other and perpendicular to the plurality of propeller shafts.

6. The system according to claim 1, wherein the second input gear and the coupler input gear are rotationally engage via helical gear teeth.

7. The system according to claim 1, wherein the driveshafts comprises three driveshafts.

8. The system according to claim 1, wherein the flange coupler has a flange coupler height, the coupler input gear has a coupler input gear height, and the flange coupler and the coupler input gear when fixed together have a combined height, wherein the combined height is less than a sum of the flange coupler height and the coupler input gear height.

9. The system according to claim 1, wherein the plurality of fasteners comprises a plurality of threaded bolt each configured to extend entirely through one of the openings in the flange coupler and one of the openings in the drive gear and is configured to receive a threaded nut thereon.

10. A method for adjusting the timing between driveshafts transmitting power from an output shaft to a plurality of propeller shafts, the method comprising:
   coupling a flange coupler to a first of the driveshafts to prevent rotation therebetween, the flange coupler defining openings therein;
   rotationally meshing a coupler input gear with a second input gear coupled to a second of the driveshafts, wherein the coupler input gear defines openings therein, and wherein at least portions of the openings in the flange couplers are aligned with the openings in the coupler input gear;
   locking one of the first of the driveshafts and the second of the driveshafts to prevent rotation thereof;
   applying a preloading torque by rotating the other of the first of the driveshafts and the second of the driveshafts while the one of the first of the driveshafts and the second of the driveshafts is locked;
   fixing the flange coupler to the coupler input gear via a plurality of fasteners extending through the openings in the flange coupler and the openings in the coupler input gear; and
   unlocking the one of the first of the driveshafts and the second of the driveshafts.

11. The method according to claim 10, wherein the openings in at least one of the flange coupler and the coupler input gear have elongated shapes to accommodate the flange coupler and the coupler input gear being rotationally fixable at multiple rotational orientations therebetween.

12. The method according to claim 10, wherein the openings in at least one of the flange coupler and the coupler input gear are kidney shaped to accommodate the flange coupler and the coupler input gear being fixable at multiple rotational orientations therebetween.

13. The method according to claim 10, wherein the flange coupler is coupled to the first of the driveshafts via splines.

14. The method according to claim 10, wherein the driveshafts are parallel to each other and configured to be perpendicular to the plurality of propeller shafts.

15. The method according to claim 10, wherein the coupler input gear and the second input gear are rotationally engage via helical splines.

16. The method according to claim 10, wherein each of the plurality of propeller shafts is configured to rotate in a given direction when operating in a forward gear, and wherein the preloading torque is applied to the plurality of propeller shafts in the given direction.

17. The method according to claim 16, wherein the driveshafts comprise two counter-rotating driveshafts, wherein the given direction of a first of the two counter-rotating driveshafts is in a first direction and the given direction of a second of the two counter-rotating driveshafts is in a second direction opposite to the first direction, and wherein the preloading torque is applied in the first direction for the first of the two counter-rotating driveshafts and in the second direction for the second of the two-counter-rotating driveshafts.

18. A gearcase for a marine propulsion device providing adjustable rotational timing between driveshafts rotated by an output shaft, the system comprising:

a flange coupler configured to be coupled to a first of the driveshafts to prevent rotation therebetween, the flange coupler defining openings therein;

a coupler input gear that defines openings therein, wherein the coupler input gear is configured to rotatably mesh with a second input gear coupled to a second of the driveshafts; and a plurality of fasteners configured to the extend through the openings in the flange coupler and the openings in the coupler input gear to rotationally fix the flange coupler and the coupler input gear, wherein the flange coupler and the coupler input gear are fixable at multiple rotational orientations therebetween;

counter-rotating propeller shafts rotated by the driveshafts, wherein each of the counter-rotating propeller shafts if configured to rotate a propeller;

wherein the rotational timing between the driveshafts is adjustable by rotating the coupler input gear into different orientations of the multiple rotational orientations relative to the flange coupler prior to fixing the flange coupler to the coupler input gear.

19. The gearcase according to claim 18, wherein the openings in at least one of the flange coupler and the coupler input gear are kidney shaped to accommodate the flange coupler and the coupler input gear being fixable at the multiple rotational orientations therebetween.

20. The gearcase according to claim 19, wherein the flange coupler is coupled to the second of the driveshafts via splines, wherein the driveshafts are parallel to each other and configured to be perpendicular to the counter-rotating propeller shafts, and wherein the plurality of fasteners comprises a plurality of threaded bolt each configured to extend entirely through one of the openings in the flange coupler and one of the openings in the drive gear and is configured to receive a threaded nut thereon.

* * * * *